United States Patent
Pellenc

(10) Patent No.: US 8,918,956 B2
(45) Date of Patent: Dec. 30, 2014

(54) HAND-HELD ELECTRIC BLOWER

(75) Inventor: Roger Pellenc, Pertuis (FR)

(73) Assignee: Pellenc (Societe Anonyme), Pertuis (FR)

( * ) Notice: Subject to any disclaimer, the term of this patent is extended or adjusted under 35 U.S.C. 154(b) by 101 days.

(21) Appl. No.: 13/818,359

(22) PCT Filed: Aug. 30, 2011

(86) PCT No.: PCT/FR2011/000481
§ 371 (c)(1),
(2), (4) Date: May 30, 2013

(87) PCT Pub. No.: WO2012/042122
PCT Pub. Date: Apr. 5, 2012

(65) Prior Publication Data
US 2013/0239361 A1 Sep. 19, 2013

(30) Foreign Application Priority Data

Sep. 20, 2010 (FR) .................................... 10 03728

(51) Int. Cl.
*A47L 5/24* (2006.01)
*A01G 1/12* (2006.01)
*E01H 1/08* (2006.01)

(52) U.S. Cl.
CPC .............. *A01G 1/125* (2013.01); *E01H 1/0809* (2013.01)
USPC .............................................. 15/405; 15/344

(58) Field of Classification Search
CPC ............... A47L 5/14; A47L 5/24; A47L 5/26; A47L 5/32; A47L 5/18; A47L 7/0038; A47L 9/08

USPC .................. 15/405, 344, 330, 409, 327.7
See application file for complete search history.

(56) References Cited

U.S. PATENT DOCUMENTS

| | | | | |
|---|---|---|---|---|
| 4,132,507 A * | 1/1979 | Akiyama et al. | ............... | 417/234 |
| 4,269,571 A * | 5/1981 | Shikutani et al. | ............. | 417/234 |
| 4,413,371 A * | 11/1983 | Tuggle et al. | .................... | 15/405 |
| 4,884,314 A * | 12/1989 | Miner et al. | ..................... | 15/344 |
| 4,945,604 A | 8/1990 | Miner et al. | | |
| 5,584,436 A * | 12/1996 | Sepke | ........................... | 239/154 |
| 6,105,206 A | 8/2000 | Tokumaru et al. | | |
| 7,735,188 B2 * | 6/2010 | Shaffer | .......................... | 15/405 |
| 7,870,640 B2 * | 1/2011 | Hinklin et al. | .................. | 15/330 |
| 8,266,762 B2 * | 9/2012 | Hsu | ............... | 15/327.5 |
| 2008/0127448 A1 * | 6/2008 | Kremsler et al. | ............... | 15/330 |

FOREIGN PATENT DOCUMENTS

DE         102007037012 A1 *  2/2008   .............. F04D 25/08

OTHER PUBLICATIONS

International Search Report for corresponding International Application No. PCT/FR2011/000481, Jun. 4, 2012.

* cited by examiner

Primary Examiner — Dung Van Nguyen
(74) Attorney, Agent, or Firm — Egbert Law Offices, PLLC

(57) ABSTRACT

A hand-held electric blower includes an air-guiding pipe comprising a proximal portion or suction pipe provided with an air inlet, a distal air outlet portion or exhaust nozzle, and a fan. The blower is characterized in that the fan consists of an axial fan, and in that the suction pipe has, upstream from the axial fan, an elbow, the proximal end of which defines the air inlet and is directed downward in terms of a working position of the device, in which the operating handle of the blower is positioned above said elbow.

13 Claims, 4 Drawing Sheets

HAND-HELD ELECTRIC BLOWER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC
Not applicable.

BACKGROUND OF THE INVENTION

1. Field of the Invention

The present invention concerns a hand-held electric blower.

The invention applies to the field of air projection devices used to 'sweep' dry leaves or diverse trash likely to cover large surfaces such as lawns, public roadways, outside parking lots etc. The result obtained by their action is similar to that obtained by use of a conventional broom or rake. The invention concerns also the field of projection devices for treatment products such as plant protective treatment products.

These devices may be intended for professional use as well as for domestic use.

2. Description of Related Art Including Information Disclosed Under 37 CFR 1.97 and 37 CFR 1.98.

Usage of these 'blowers' is extremely wide-spread due to their great simplicity of use, the speed of performance of the clean-up tasks and their efficient action.

Such devices consist mainly of an air-guiding pipe featuring a proximal air inlet portion or suction pipe, a distal air outlet portion or exhaust pipe, and an axial OF centrifugal fan positioned inside the middle portion of the pipe. This fan sucks up air and delivers it in the form of an air flow enabling the pushback of the dry leaves or various trash so as to amass them in a pile that can easily be removed. This fan may be driven by a thermal engine or an electric motor.

These devices may be fitted. for propelling treatment products such as plant protective treatment products. The devices of this kind may present themselves in the form of hand-held tools or they may be attached to a user's back by means of a harness.

Patent document US-200870127448 describes a blower provided with a centrifugal fan. According to this document, the suction pipe is covered by a grid and the centrifugal fan housed in a spiral shell is directly driven by a thermal engine. However, this device is heavy, it is an energy guzzler and its operation is very noisy. Especially the fan's rotation, the passage of air over the obstacles placed in the flow (air inlet protective screen, the supports), etc., create direct noise pollution of the surroundings of the blower and for the user. Furthermore, this noise pollution generally affects the well-being of the user who is obligated to wear some kind of hearing-protection such as ear plugs, a helmet or other.

Patent documents U.S. Pat. No. 4,413,371 and DE 102007037012 present below some blowers provided with an axial fan.

In the U.S. Pat. No. 4,413,371 patent, the device is composed of a first unit comprising a thermal engine and a second unit featuring the blower system, the thermal engine being, directly coupled to the axial fan. The latter is housed at the end of a long exhaust pipe presenting decreasing width and an end extending this an outlet of thin thickness. Said blower is equipped with two operating handles. This device is complex and seems to be difficult to handle considering the weight of the thermal engine and its configuration. As a matter of fact, two operating handles are necessary for its manipulation and the end of the exhaust pipe must be kept close to the ground. Another inconvenience is the low performance of the device despite of the use of an axial fan.

In document DE-102007037012, driven by an electrical motor, the proximal air inlet portion or suction pipe is mounted in the rotational axis of the fan constituted by a number of helixes that are coupled to each other. This arrangement is supposed to improve the performance of such devices and to reduce the noise. The noise does however remain unusually high and the performance is still just as mediocre.

In summary, the various representative documents of prior art have in common such disadvantages as high energy consumption, low performance and significant noise pollution, Objectives of the Invention A major aim of the invention is to remedy the inconveniences of the prior art, in particular the disadvantages of the devices described in the aforementioned documents, or to lessen to a large extent the harmful effects of some of these inconveniences.

The objective of the invention is to significantly reduce the noise of the blower and, at the same time, optimize its performance.

Another objective of the invention is to propose a simple, low-cost., low-energy consuming blower that is environment-friendly and has a pleasing appearance.

BRIEF SUMMARY OF THE INVENTION

According to the invention, these objectives have been reached with a hand-held electrical blower of the kind comprising an air-guiding pipe featuring a proximal portion or suction pipe with an air inlet, a distal air outlet portion or exhaust pipe and a fan. The invention is remarkable in that said fan is an axial fan and in that said suction pipe features, upstream of the axial fan, an elbow whose proximal end which defines the air inlet is oriented downward, taking into account a working position of the device according to which the operating handle of the device is positioned above it.

In this way the downward oriented suction pipe directs the noise downward and away from the user's ears while also reducing it.

According to an advantageous disposition, the elbow of the suction pipe forms an angle between 60° and 120°, relative to the axis of the axial fan.

According to another characteristic disposition of the invention, the blower is fitted so as to constitute a treatment product sprayer, for example of plant protective treatment products, as an inlet for a treatment product is provided in the guiding pipe, downstream and, for instance, in proximity of the axial fan, this inlet for treatment product being adapted for connection to a treatment product tank.

According to another advantageous characteristic disposition, the portion of the suction pipe comprised between the proximal end of the air inlet and the middle portion of said suction pipe containing the axial fan presents a decreasing section or converging shape in direction of the axial fan.

This configuration permits optimizing the air flow at the inlet of the axial fan.

According to another characteristic disposition of the invention, the proximal end defining the air inlet features a section whose dimension in the main axis is less than the dimension in the axis that is perpendicular to the main axis.

Preferably, the proximal end defining the air inlet features a section that is ellipsoidal or essentially ellipsoidal section, oblong or essentially oblong, the short axis of which is oriented in the main axis of the blower.

This section which is essentially in the shape of an ellipse makes the device more compact, for a small space requirement, and at the same time, makes it easier to handle.

According to another characteristic disposition, the inside wall of the suction pipe positioned upstream of the axial fan presents a surface that is free of any roughness.

In this manner, there is no turbulence of the air circulating along the suction pipe thereby promoting noise mitigation.

Preferably, the section of the air inlet end of the suction pipe is two to four times larger than the section of said suction pipe, in its part located upstream and in proximity of the axial fan.

Advantageously, the air inlet constituted by the proximal end of the suction pipe is delimited by a section edge or flange that is progressively rounded, and the inside rim of which is tangent to the inside surface of the elbow.

This flange permits to reduce loss of air pressure quite significantly and thus to improve aerodynamic performance.

Advantageously, the suction pipe is constituted by an assembly of two symmetrical parts with fastening functions for the inlet screen and being on the other hand easy to produce by injection of plastic material for example.

According to the invention, the blower is provided with feet integrated in the flange. Preferably the blower is powered by a batter inserted inside it or worn un the belt or on the back.

BRIEF DESCRIPTION OF THE DRAWINGS

The above aims, characteristics and advantages, and still more will become dearer in the following description and the attached drawings in which.

DETAILED DESCRIPTION OF THE INVENTION

Reference is made to said drawings to describe interesting, although by no means limiting examples of implementations of the blower according to the invention.

In the following description and in the claims the words 'high' and 'low' are used in reference to the position of the blower in operation. These terms have consequently no limiting connotations.

Figure 1:
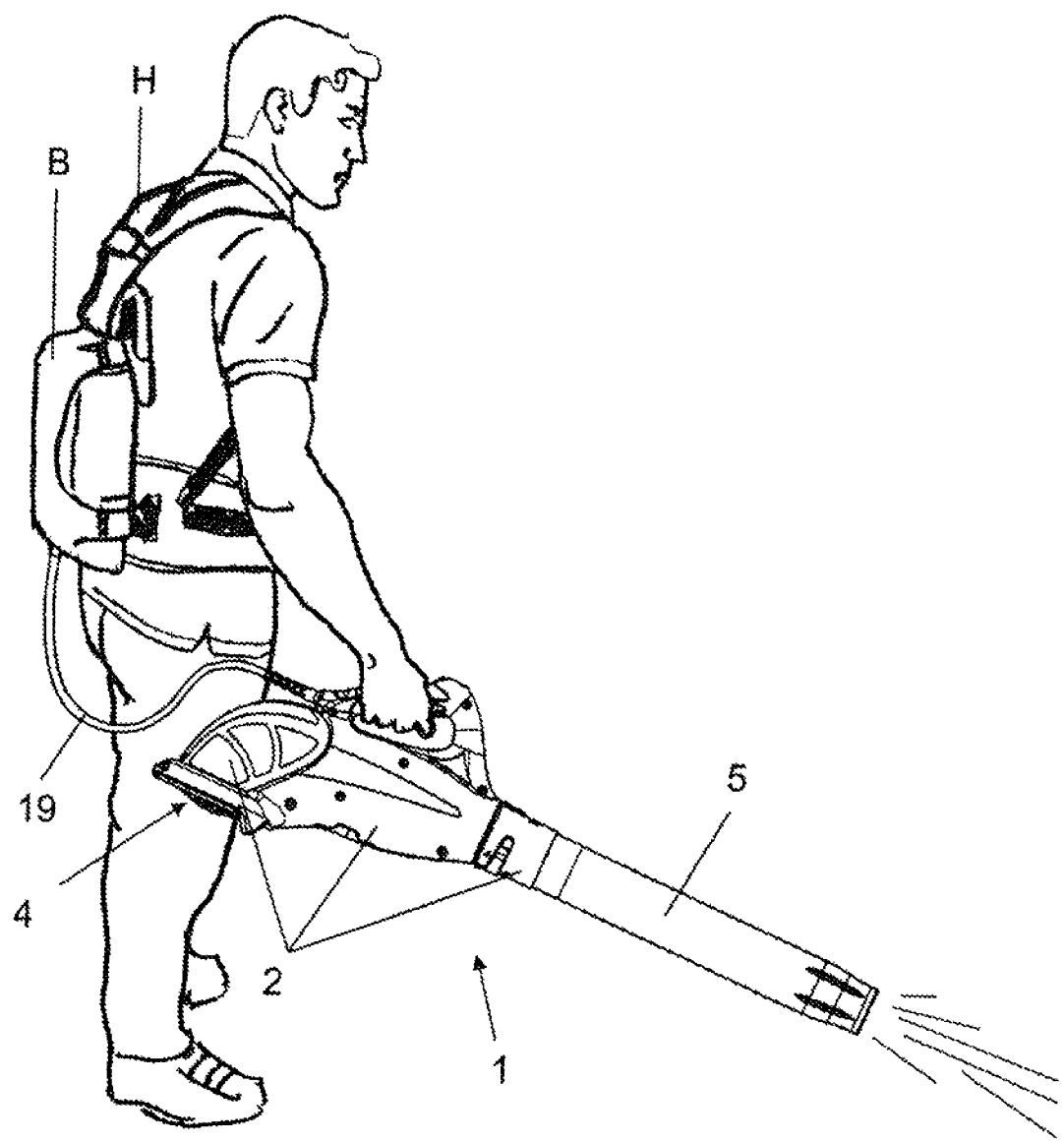
FIG. 1 shows a view in which the blower is carried by a user, said blower being powered by a battery carried on the back, via an electric power cord.
Figure 2:
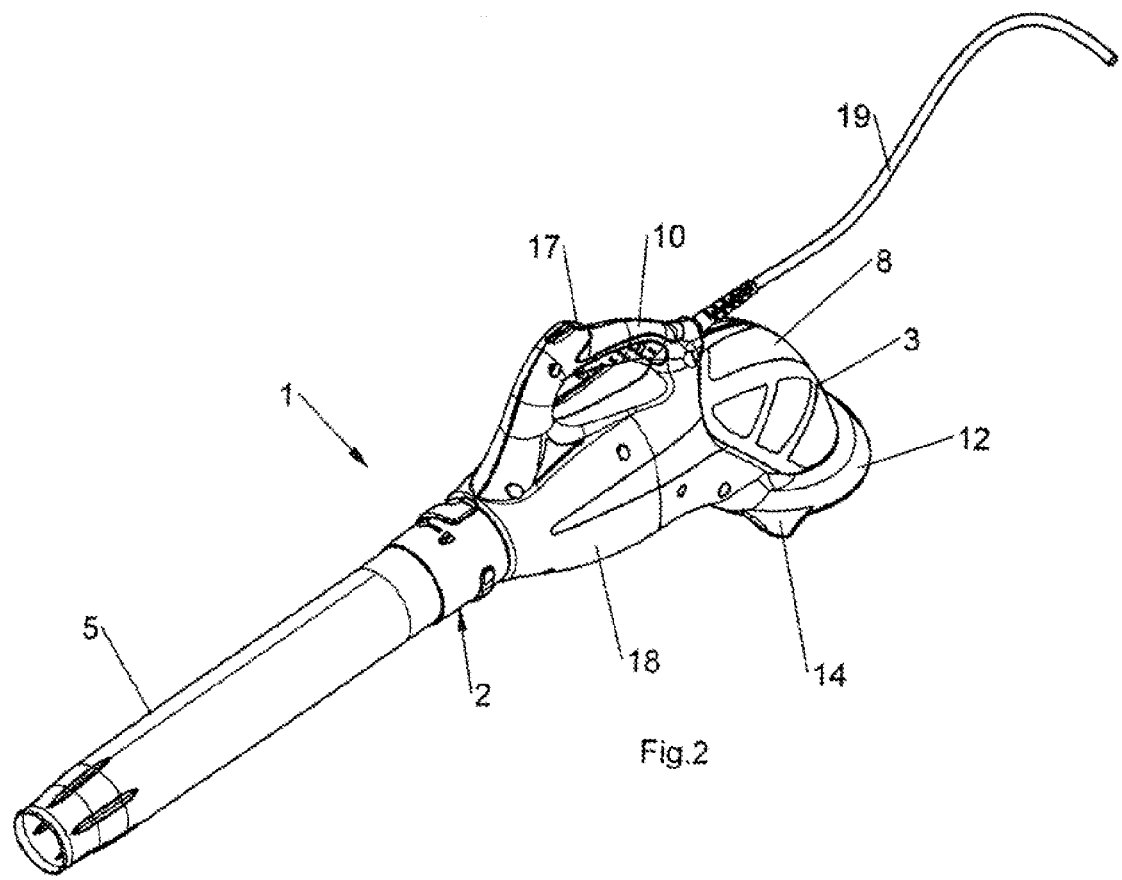
FIG. 2 is a perspective view of the blower.
Figure 3:
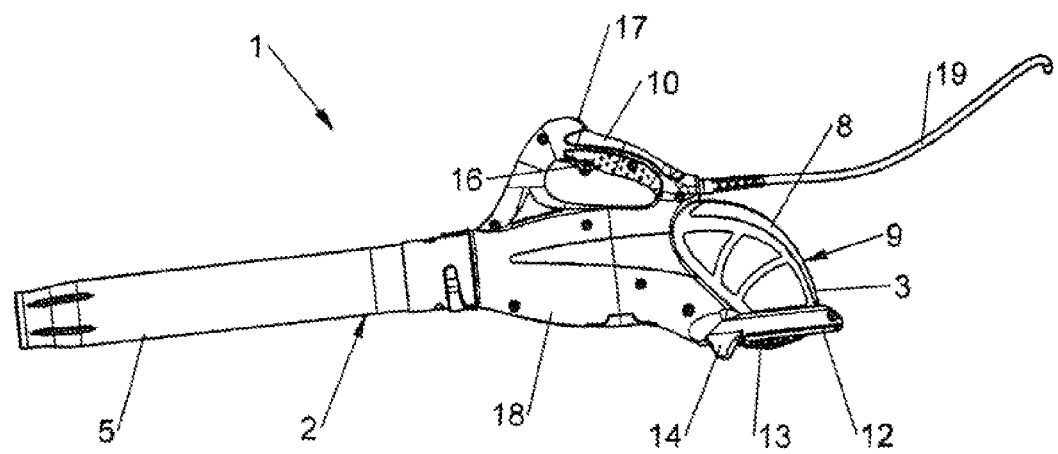
FIG. 3 is a side view of the blower.

The blower 1 shown in FIG. 2, comprises primarily an air-guiding pipe 2 featuring a proximal portion or suction pipe 3 provided with an air inlet 4, a distal air outlet portion or exhaust nozzle 5 and a fan 6.

According to the invention, the axial fan 6 is housed in the middle portion 7 of the air-guiding pipe 2 and more precisely, in the suction pipe 3 and it is of the axial type.

Furthermore, the blower 1 is powered by an electrical motor 15 in direct contact with the axial fan 6.

The suction pipe 3 presents, upstream of the axial fan 6, an elbow 8 whose proximal end delimiting the air inlet 4 is directed downward, taking into account a working position of the device according to which the operating handle 10 of said device is placed above it and oriented upward.

The axial fan 6 is located in the extension of the axis of the air inlet 4, downstream of the elbow 8, and disturbs as little as possible the performance of the blower 1.

The operating handle 10 permits holding said blower 1 in the hand and to orient the guiding pipe 2 towards the area that is to be cleaned. This operating handle 10 is also provided with a switch 16 and means 17 for adjusting the power of the motor 15.

According to the invention, the elbow 8 forms an angle between 60° and 120° relative to the axis of the axial fan 6. Preferably, the elbow 8 may present an angle in the neighborhood of 90°.

The blower 1 may also be fitted to constitute a sprayer of treatment product, for example of plant protective treatment products. It includes, for this purpose, a treatment product inlet 20 provided in the guiding pipe, more precisely, downstream, and, for example, in proximity of the axial fan 6. This inlet 20 of treatment products is suitable for being, connected to a container (not shown) of treatment product. In this case, and in an operating position, the exhaust pipe 5 can be directed upward so as to spray plant leaves to be treated, with the air inlet 4 still being oriented in the downward direction.

Figure 4:
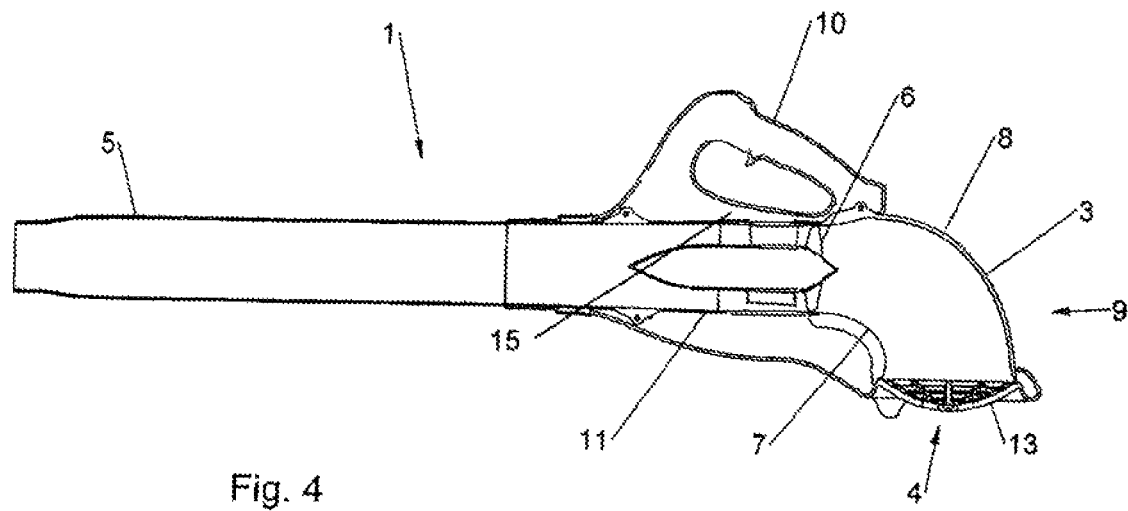
FIG. 4 is an axial section view of the blower according to FIG. 3.
Figure 5:
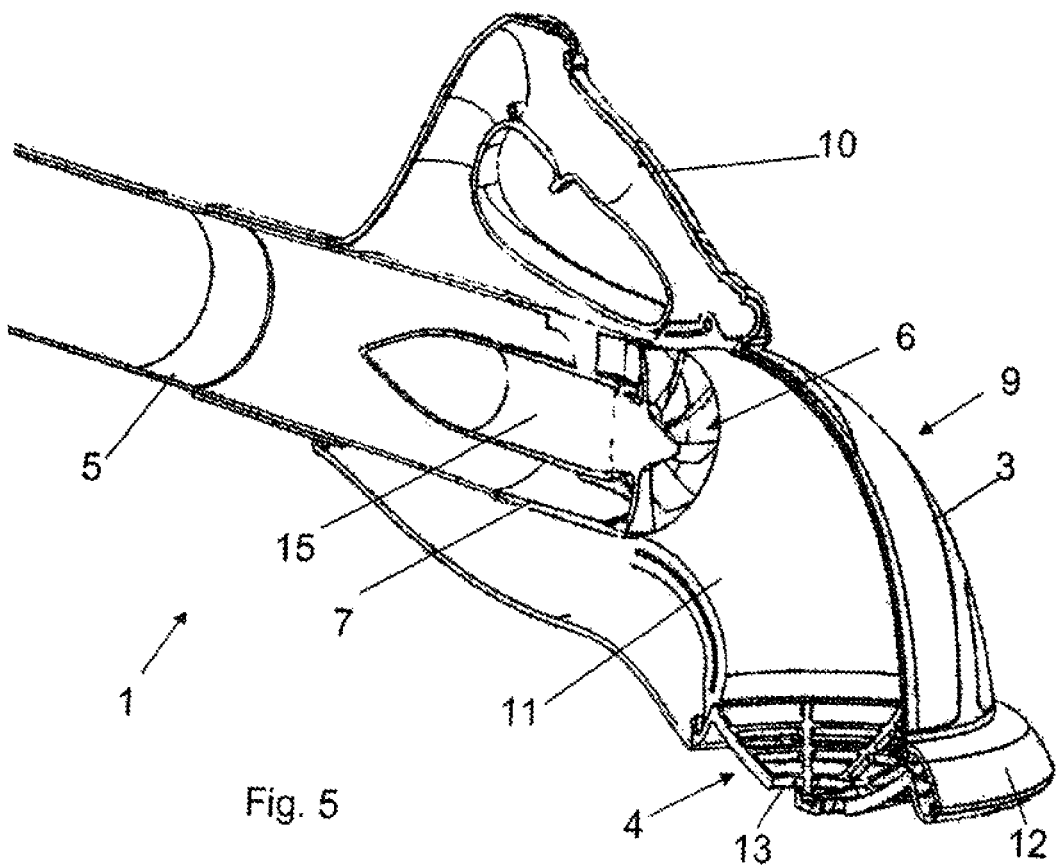
FIG. 5 is a detailed view of the proximal part, in axial section and perspective view of the blower according to FIG. 4.
Figure 6:
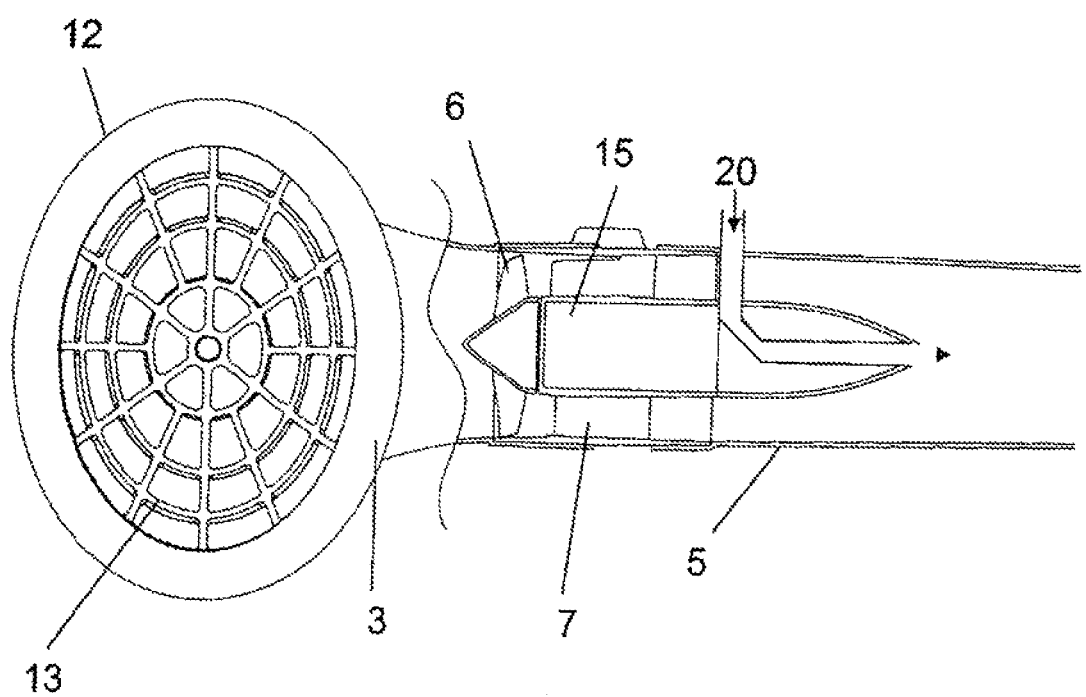
FIG. 6 is a view of the underside of the blower showing the air inlet.

As can be seen on FIGS. 4, 5, and 6, portion 9 of the suction pipe 3 comprised between the proximal end of the air inlet 4 and the middle portion 7 of the suction pipe 3 where the axial fan 6 is located, presents a decreasing section or convergent shape in direction of the axial fan 6. This arrangement is intended to promote the tow of ambient air drawn in by the air inlet 4.

In addition, the proximal end delimiting the air inlet 4 presents a section whose dimension in the main axis is less than the dimension in the axis perpendicular to the main axis.

The portion 9 comprised between the proximal end of the air inlet 4 and the middle portion 7 of the suction pipe 3 presents, in addition, an ellipsoidal or essentially ellipsoidal section. More precisely, the proximal end delimiting the air inlet 4 presents a section that is ellipsoidal or essentially ellipsoidal, oblong or essentially oblong, and the short axis of which is oriented in the main axis of the blower 1.

According to the invention, the inside wall 11 of the suction pipe 3 placed upstream of the axial fan 6 presents an even surface without any roughness. This characteristic avoids turbulence in the flow of aspirated air during its passage in the suction pipe 3 of the guiding pipe 2, which promotes abatement of the noise created by this suction.

FIG. 5, represents the end of the air inlet 4 of the suction pipe 3 which is two to four times greater than the section which the suction pipe 3 presents in its portion located upstream and in proximity of the axial fan 6.

This air inlet 4 of the suction pipe 3 is delimited by a rim or flange 12 presenting a progressively rounded section and whose inside rim is tangent to the inside surface of elbow 8, so as to enhance the aerodynamics of the device and to contribute to noise reduction.

This flange 12 is provided with feet 14 placed on either side of it for placing the blower on the ground or other support surfaces.

Furthermore, the air inlet 4 is covered, by a screen 13 featuring fasteners intended for fitting into the end of the suction pipe 3. This screen 13 presents furthermore a curved shape, to fit perfectly into the end of the suction pipe 3. It could, of course, have a flat shape.

The suction pipe 3 may result from a process constituted by the assembly of two symmetric parts fastened to each other by any appropriate means, for example, by fasteners of the screw-nut type.

Preferably, these two parts may be permanently mounted.

Advantageously, these symmetric parts incorporate fastening functions for the inlet screen.

This process greatly facilitates the installation of the axial fan 6 and its drive motor 15, as well as the installation of the screen of the air inlet 4.

The guiding pipe 2 of the blower 1 may be constituted by a removable assembly of at least two detachable parts, namely the suction pipe 3 and the exhaust pipe 5 mounted in the extension of the suction pipe 3, in the adaptation of usage of said blower 1.

The guiding pipe 2 and the various parts constituting the elbow 8 can be produced by injection of plastic material.

The blower 1 presents also a housing 18 of aerodynamic shape which covers and matches the shapes of a portion of the guiding pipe 2. It may consist of several detachable parts. It carries primarily the operating handle 10 which, as previously indicated, permits handling and directing the blower 1 during its use.

it is expressly stated however that according to another method of implementation, the blower 1 could be provided with a ring or any other fastening device so that it could be suspended from a harness H worn by the user.

On the other hand, the electrical motor 15 may be powered either by a battery B inserted in the blower, or through an electric cable 19 equipped with a means of connection to a power source (plug to the power circuit Of a battery carried on the belt or on the back).

The invention claimed is:

1. Hand-held electric blower comprising an air-guiding pipe featuring a proximal part or suction pipe provided with an air inlet, a distal air outlet portion or exhaust pipe and a fan housed in the air-guiding pipe, characterized in that said fan is an axial fan and in that said suction pipe presents, upstream of the axial fan, an elbow whose proximal end delimiting the air inlet, is oriented downward, taking into account a working position of the blower according to which the operating handle of the blower is placed above it.

2. Hand-held electric blower according to claim 1, characterized in that it is fitted to constitute a treatment product sprayer, for example, of plant protective treatment products, a treatment product inlet, being provided in the guiding pipe downstream of the axial fan, this inlet of treatment product being fitted for being connected to a treatment product container.

3. Hand-held electric blower according to claim 1, characterized in that the elbow of the suction pipe forms an angle between 60° and 120°, relative to the axis of the axial fan.

4. Hand-held electric blower according to claim 3, characterized in that the elbow of the suction pipe forms an angle in the order of 90° relative to the axis of the axial fan.

5. Hand-held electric blower according to claim 1, characterized in that the portion of the suction pipe comprised between the proximal air-inlet end and the middle portion of said suction pipe which houses the axial fan, presents a decreasing section or convergent shape in the direction of the axial fan.

6. Hand-held electric blower according to claim 1, characterized in that the proximal end delimiting the air inlet presents a section whose dimension in the main axis is less than the dimension in the axis that is perpendicular to the main axis.

7. Hand-held electric blower according to claim 1, characterized in that the proximal end delimiting the air inlet presents an ellipsoidal or essentially ellipsoidal, oblong or essentially oblong section whose small axis is oriented in the main axis of the blower.

8. Hand-held electric blower according to claim 1, characterized in that the inside wall of the suction pipe positioned upstream of the axial fan presents a surface that is free of any roughness.

9. Hand-held electric blower according to claim 1, characterized in that the section of the air inlet end of the suction pipe is two to four times larger than the section presented by said suction pipe in its portion positioned upstream and in proximity of the axial fan.

10. Hand-held electric blower according to claim 1, characterized in that the air inlet constituted by the proximal end of the suction pipe is delimited by a rim or flange of a progressively rounded section, and the inside rim of which is tangent to the inside surface of the elbow.

11. Hand-held electric blower according to claim 1, characterized in that the suction pipe is constituted by the assembly of two symmetric parts integrating also fastening functions for the inlet screen.

12. Hand-held electric blower according to claim 10, characterized in that feet are integrated into the flange.

13. Hand-held electric blower according to claim 1, characterized in that it is powered by either a battery inserted into the blower, or through an electric cable provided with a connector to a power source or battery worn on the belt or on the back.

* * * * *